INVENTOR
ROYAL J. SCOVILL
ATTYS.

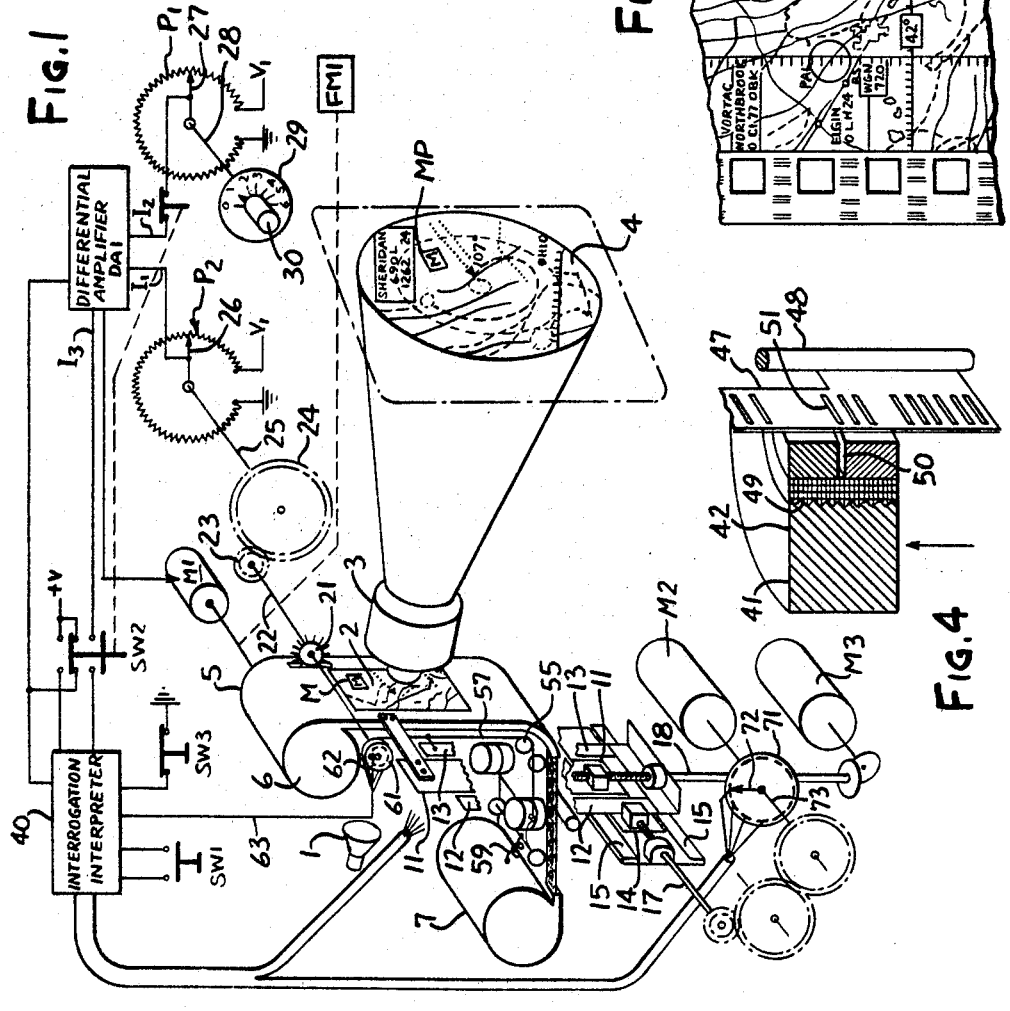

Oct. 28, 1969  R. J. SCOVILL  3,474,556
NAVIGATIONAL CHART DISPLAY APPARATUS
Original Filed Jan. 3, 1967  3 Sheets-Sheet 3
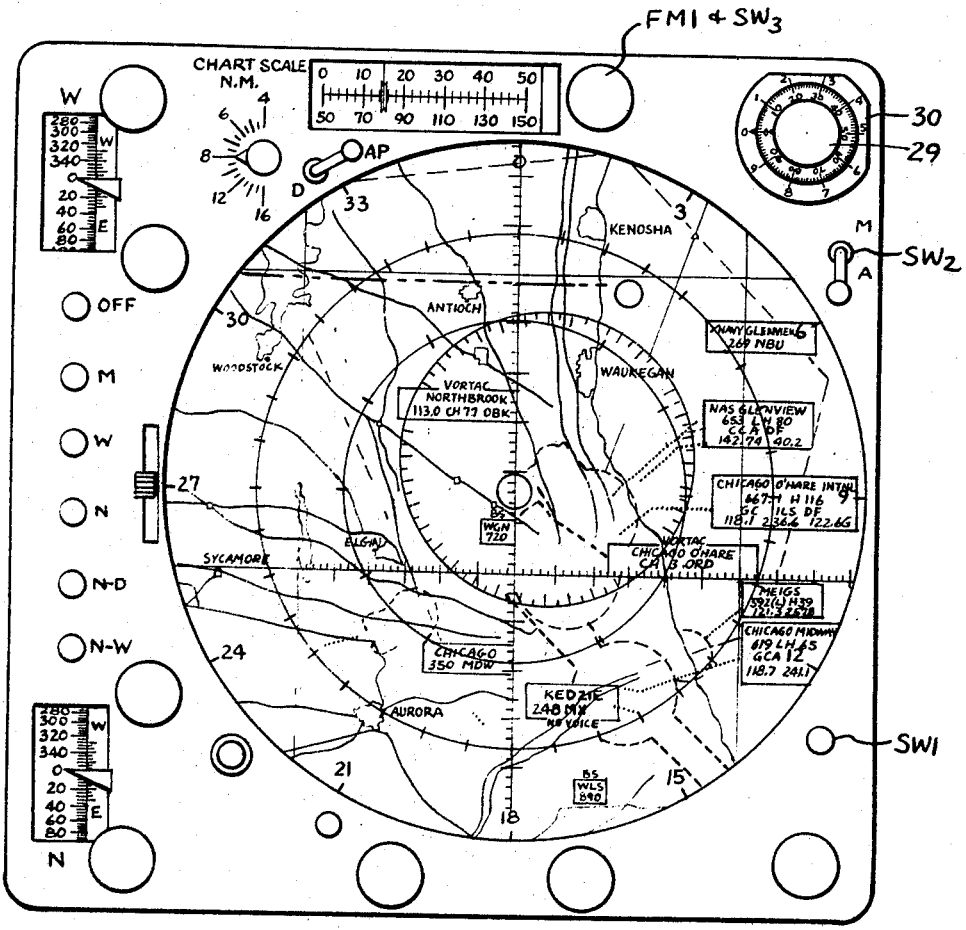
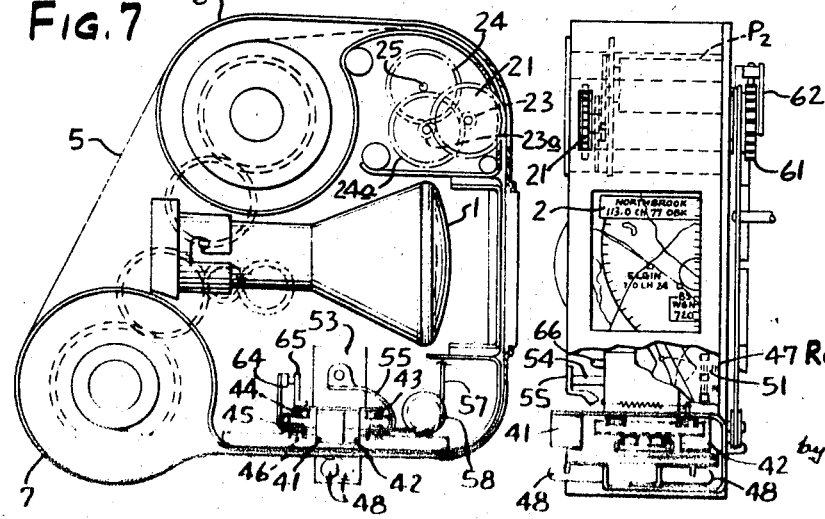
INVENTOR
ROYAL J. SCOVILL
by Wolfe, Hubbard, Voit & Osann
ATTYS

United States Patent Office 3,474,556
Patented Oct. 28, 1969

3,474,556
NAVIGATIONAL CHART DISPLAY
APPARATUS
Royal J. Scovill, Box 1059, Ogden Dunes,
Portage, Ind. 46368
Continuation of application Ser. No. 606,960, Jan. 3,
1967. This application Jan. 9, 1969, Ser. No. 791,876
Int. Cl. G09f 11/28; G01s 3/02
U.S. Cl. 40—31           8 Claims

ABSTRACT OF THE DISCLOSURE

A navigational chart display apparatus for use with a pictorial navigation computer which produces a continuous visual indication on a chart of an aircraft's position, speed and heading. An automatic or semi-automatic storage and retrieval means permits the pilot to select the correct chart for an existing situation and to change charts for an approaching situation, all without extensive and time consuming manipulation of controls.

---

This is a streamlined continuation of parent application, Ser. No. 606,960, filed Jan. 3, 1967, and now abandoned.

The application is related to my previous application bearing Ser. No. 456,455 filed May 17, 1965, and now abandoned and is a further refinement of the film frame selector shown as item 14 on FIG. 2 of the previous application. This invention relates to vehicle position indicating apparatus and more specifically to pictorial navigation computer apparatus for aircraft for responding to omni bearing and distance measuring transmitting station equipment. While not limited to aviation the invention finds particularly advantageous application in airborne systems for providing a continuous visual indication on a map of an aircraft's exact location, speed and heading throughout a given flight.

This particular specification is concerned primarily with an automatic or semi-automatic means for positioning the film to the desired next chart as the aircraft progresses across the chart in view. Present systems do not use film for such purpose as this and are confined mostly to paper maps and charts with books of charts of local airport presentations which include navigation, airport runway and other information pertinent to the landing and taking off of aircraft in an airport location. The use of present charts and the expansion of the airport system throughout the United States in particular and the world in general has made the filing, the caring for and the handling of maps a particularly difficult situation. The total volume of information required has made it necessary that sections of charts and local information be filed in separate volumes. A considerable amount of cockpit space is taken up by the present paper charts and other related information. It becomes tediously time consuming to file periodic revisions which are mailed by the various producers of charts.

It is a general aim of this invention to provide a means to gather sufficient data on a strip film that would be usable over a relatively large area, the continental United States for example, and which could be completely replaced on a frequent basis with film that has been revised to contain and depict current data.

In order to locate desired information on such a strip film which could run into many feet in length it is desirable that an indexing system be provided which will permit the pilot to readily select the correct chart for his given situation and which will further permit him to change charts for a situation approaching without extensive and time consuming manipulation of controls. A particular object of this invention therefore is to provide a means to store on an automatic or semi-automatic basis and selectively place before the pilot a chart which is desired.

It is a further object of this invention to provide a means to select a particular area of a total film length wherein the total length of film may vary over a wide range and the means to select particular portions will readily accommodate a long or relatively short film strip. Other objects and advantages of the invention will become apparent from the following detailed description taken with the accompanying drawings, wherein:

FIG. 1 is a perspective schematic diagram of certain illustrative equipment exemplifying the present invention.

FIG. 2 is a detail of a typical 35 mm. film strip used in the equipment of FIG. 1.

FIG. 3 is an enlarged perspective diagram of the automatic means provided to interrogate indicia on the film.

FIG. 4 is an enlarged cross section of the photocell, the film showing indicia and the projection light.

FIG. 6 is a frontal view of a physical embodiment of the equipment which utilizes this film indexing and transport means showing the control panel and viewing screen.

FIG. 7 is a side elevation of a physical embodiment of the film storage and indexing means.

FIG. 8 is a frontal elevation of a physical embodiment of the film storage and indexing means.

Figure 5:
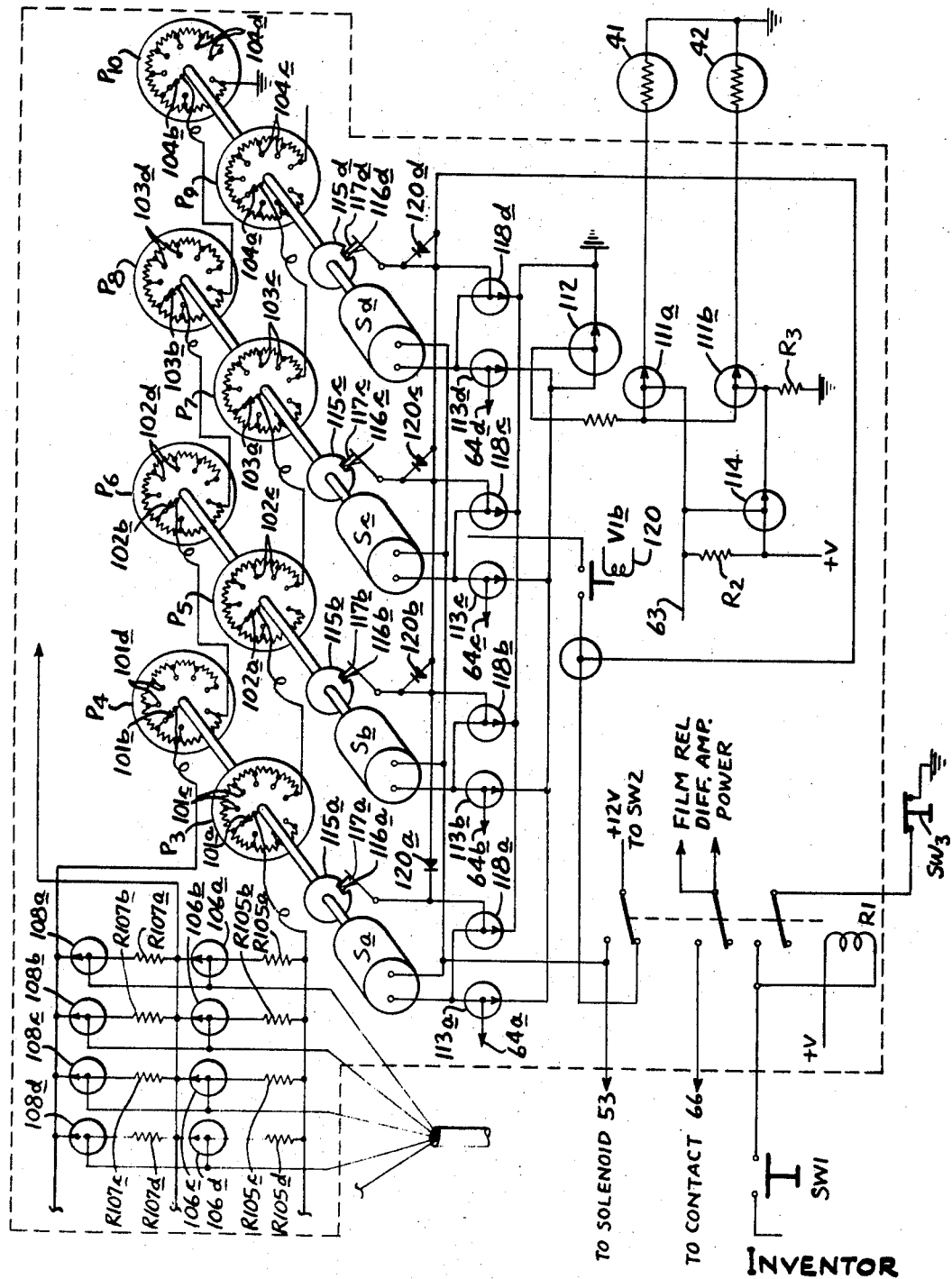
FIG. 5 is an electrical diagram of the interrogation interpreter.

While the invention will be described in connection with an illustrative embodiment, it will be understood that I do not intend to limit the invention to that embodiment, but intend to cover all alternatives and equivalent constructions included within the spirit and scope of the invention as defined by the appended claims.

SEMI-AUTOMATIC FILM POSITIONING MEANS

Referring to the perspective schematic diagram of the equipment shown in FIG. 1, the equipment includes a projection system which consists of a projection light 1, a film 2, a lens 3 and a viewing screen 4. For the purpose of storing film and being able to selectively place portions of the strip of film in the projection system in the position shown as 2, a film magazine 5 has been provided. Film magazine 5 contains a reel, not shown, in cylinder 6 and a second reel, not shown, in cylinder 7. Film, therefore, may be wound on the reel in cylinder 6 and threaded by the viewing frame 2, the strip then continuing through the film transport slot into cylinder 7 where the balance of the film may be wound on the reel in cylinder 7. A film transport means has been provided which consists of motor M1 which is connected to the reel in cylinder 6 and cylinder 7 to cause the film to be driven in one direction or another winding up on the reel in cylinder 6 or the reel in cylinder 7 as motor M1 rotates in either a clockwise or counterclockwise direction.

In order to hold the film strip being viewed firmly in the viewing frame, a clamping means, not shown in detail, is utilized. This means clamps the viewing area of film between two pieces of glass and thus fixes the frame to be viewed with respect to the film magazine in any random selected position along the film strip. Thus the charted features depicted on the frame so selected may be accurately located with respect to the axis of projection.

For the purpose of supporting the film magazine 5 and its contained film in the projection system and to provide a means to accurately move the film area being viewed with respect to the axis of the projection system, a vertical and horizontal slide arrangement has been provided. Vertical slide member 11 to which film megazine 5 is connected transmits vertical motion to the film magazine as it moves up and down between the vertical stationary slide members 12 and 13. Vertical stationary members 12 and 13 are fastened to horizontal slide 14 which transmits horizontal movement to the film magazine and thus to film area 2 as slide 14 moves between its stationary guide members 15 and 16. Stationary members 15 and 16 are fastened to the instrument mounting plate.

In order to produce this vertical and horizontal movement of the film, drive motors M2 and M3 are utilized. Drive motor M2 produces a rotational movement of horizontal drive screw 17 which transmits horizontal movement to the film magazine and thus to film area 2. Likewise drive motor M3 transmits rotational movement through vertical drive screw 18 which in turn transmits verical movement through the supporting means to the film magazine 5 and thus to the viewed area of the film 2.

Means is provided for determining the relative location of the area of the film in the axis of projection with respect to its position along the length of the film strip. In the present instance, such means includes a sprocket wheel 21 which engages sprocket holes on the side of the film and is rotated by the film as it passes through the film grooves and between the reels in cylinders 6 and 7. Thus, as the film is transported from reel to reel, sprocket 21 is rotated. Sprocket 21 imparts rotational movement to shaft 22 which in turn rotates gear 23 and gear 24. Gear 24 imparts rotational movement to shaft 25 which is connected to contact arm of potentiometer P2. Potentiometer P2 is a linear type potentiometer with, for example, one end of its resistance element connected to ground and the other end connected to a point having a fixed voltage V1 with respect to ground. Thus as the film is transported past the axis of projection sprocket 21 is rotated which in turn causes the contact arm 26 of potentiometer P2 to rotate. Connected to contact arm 26 is a wire which applies the voltage impressed on contact arm 26 to one of two input terminals $I_1$ of differential amplifier DA1. Connected to the other input terminal $I_2$ of differential amplifier DA1 is a wire which leads to the contact arm 27 of a potentiometer P1. One end of the resistance element of potentiometer P1, is connected to a point subjected to the fixed voltage V1 with respect to ground and the other end of the resistance element of potentiometer P1 is connected to ground. Contact arm 27 of potentiometer P1 is mounted on shaft 28 which is connected to setting knob 30. The pointer on setting knob 30 indicates a setting on scale 29. Thus for a given setting as read on scale 29 by the pointer on knob 30 a voltage which varies as the indicated setting, is transmitted via contact arm 27 to the second input terminal $I_2$ of differential amplifier DA1.

Differential amplifier DA1 is a conventional known type amplifier which receives a polarized signal and is capable of producing an amplified signal or like polarization as its output. The output of differential amplifier DA1 thus is used to drive motor M1 in one direction or the other depending upon the polarization of the signal developed. Thus if the voltage produced by the contact arm 27 of potentiometer P1 is higher than the voltage produced by the contact arm 26 of potentiometer P2 the signal sent by differential amplifier DA1 to motor M1 causes motor M1 to drive the film in a direction such as to increase the voltage output of contact arm 26. Likewise if the voltage produced by contact arm 27 is of a lesser value than the voltage produced by contact arm 26, differential amplifier DA1 produces a signal which causes motor M1 to drive the film in such a direction as to cause the contact arm 26 to rotate to a position of a lesser voltage. When these voltages are identical no film movement is caused. By this described means the areas on the film strip are located along the strip by code numbers which correspond to the numbers shown on scale 29 by pointer 30.

Provision is made for indicating to the pilot or viewer the associated film area which, for example, might be the local chart associated with the area of the chart being viewed. For this purpose, a number or mark indicated by M on the film area 2, and by MP projected on the screen, is placed on the chart which corresponds to the code number described so that the pilot may set his film indexing means to this number. Thus, from information on the film, the pilot may position the film index to the next desired film area which in one instance might be the local area chart when he has been using the chart of general area coverage. This of couse could be used as well with a radio facility chart and could indicate an approach procedure chart for a given airport as the pilot approaches his destination.

AUTOMATIC FILM INDEXING MEANS

To facilitate automatic indexing the film strip to the next area which might be associated with the area being viewed a coding system has been adopted. The system utilizes film space between the sprocket holes and on the edge of the film but outside of the film frame area used for viewing which contains maps, charts and other navigation information. FIGURE 2 is a section of film strip which indicates the area in the center as containing chart information and shows a series of lines at either edge of the film. These lines constitute the coded information. The area of the film assigned to record this coded information extends for approximately .080 of an inch between the sprocket holes on standard 35 mm. projection film and is approximately .180 of an inch from the inside edge of the holes to the outer edge of the film. This coded information consists of a series of dashed lines in four sequences each of which can contain up to ten lines.

Coded information from the film is read by a reading mechanism illustrated in detail in FIGS. 3, 7 and 8 the reading mechanism comprises two light sensitive cells Nos. 41 and 42 mounted on a slide 43. Slide 43 is held by rollers 44 which is mounted on rollers 46. Rollers 46 cooperate with member 47 which is fixed to the film magazine. Light sensitive elements 41 and 42 are shown diagrammatically in cross section in FIG. 4. This cross section likewise shows the film area assigned to coded information and the interrogation projection light 48. Referring to FIG. 4 the light sensitive area 49 receives light through light shielding slot 50 when a clear area of the film is over the slot and between the light sensitive cell and the projection lamp 48. However, when an opaque line 51 passes over the slot, light is blocked from the slot 50 and does not strike upon light sensitive area 49. The particular characteristic or a light sensitive cell such as 41 and 42 is to vary its resistance with the amount of light which falls upon the photosensitive element 49. Therefore the variations in light which fall upon photosensitive element 49 produce a variable resistance through the cell. This variable resistance produces electrical pulsations which are transmitted to interrogation interpreter 40 and are used to adjust a reference voltage as described subsequently herein.

For the purpose of moving sensitive cells 41 and 42 across the film to scan the information thereon, a solenoid 53 is mounted in a fixed manner to slide 43 while the plunger 54 is fastened to carriage 45 by arm 55. Activation of solenoid 53 therefore causes slide 43 to travel across the film in a left to right or bottom to top motion. When solenoid 53 is deactivated spring 56 returns slide 43 and the connected light sensitive elements 41 and 42 to the initial starting point.

Referring to FIG. 2, the coded information on the film is located between the sprocket holes which are opposite each other in a transverse axis of the film strip. For the purpose of associating the coded information recorded between the sprocket holes on the film with one specific area of the film and more particularly the coded information under or in the scanning area adjacent to the light cell 41 or 42 with the specific area of the film being projected on the screen, a means has been provided to maintain a constant distance between the axis of projection of the film and the location of the scanning photocells 41 and 42. Cord 57 is connected to carriage 45 and extends in a horizontal direction where it passes over sheave 58 into a vertical direction wherein it is fastened to bracket 59 which is supported by vertical slide stationary member 13. Tension is maintained in cord 57 by spring means (not shown). Thus as film magazine 5 and connected film area 2 moves in a vertical direction, photocell carriage 45 is moved with respect to the film strip and more particularly the film area 2 being viewed so that the distance along the film strip from the axis of projection to the scanning position of cells 41 and 42 remains constant. Likewise as cell 41 is moved along the length of one edge of the film it alternately will travel over the space in the film devoted to the sprocket hole for a portion of its travel and over the coded information for the remainder of its travel. Thus during the time it is over the coded information 47, it can be used to interrogate the film for the information printed thereon. Photocell 42 is mounted on slide 43 in such a manner that it is one half the distance between the sprocket holes on the film, offset from the transverse axis of photocell 41. Therefore as cell 41 passes out of the area of information on its side of the film, cell 42 is passing into the area of information on the opposite side of the film.

As a means for selectively connecting cells 41 and 42 to the interrogation interpreter 40 a commutator disk 61 is mounted on sprocket shaft 22. This disk is free to rotate on shaft 22 in a bearing with which it is mounted. Connected to this disk is an extension of cord 57. Cord 57 extension is fastened securely to disk 61 and rotates the latter as it is pulled with respect to the axis of rotation of disk 61. Tension is maintained in cord 57 extension by a clock spring arrangement (not shown) but contained in disk 61 the spring being connected to disk 61 and to the film magazine body. Thus as film magazine 5 and film projected area 2 are caused to move in a vertical direction disk 61 is rotated on shaft 22. Connected to shaft 22 is a contact arm 62 which touches commutator segments on disk 61. These commutator segments are alternately electrically conductive and non-conductive. All of the electrically conductive segments are connected together and to wire 63 which transmits an electrical signal to interrogation interpreter 40. The commutator segments are spaced so that for example, when the contact arm is on one electrically conductive segment, photocell 41 is in a position over the coded information and when contact arm 62 is on a non-conductive segment, photocell 42 is over an area of coded information. The means to utilize this signal in the interrogation interpreter will be described later. However this signal permits interrogation interpreter 40 to cause the signal to be received from photocell 41 when wire 63 is receiving an electrical signal and causes photocell 42 to be active when wire 63 is not receiving an electrical signal.

In this manner information recorded on the edge of the film may be transmitted to the interrogation interpreter 40. By the alternate means of interrogating the film described, coded information may be assigned in increments of half the distance between the sprocket holes of the film or approximately .080 of an inch. In practice this could represent a 20 mile distance on a chart photographed to the WAC or World Aeronautical Chart scale. For example, within a 20 mile band on such a chart or for a distance on the film of .080 which might be the strip transverse of the film strip between the sprocket holes, coded information would be provided on the side of the film relative to the chart area projected in this band. This coded information would indicate what areas of film in the strip are associated with the chart being viewed and might be desired by the pilot as the next chart which he would require in his flight.

In order to identify to the interrogation interpreter the sequence of pulses received by photocells 41 and 42 and those identifying which group of the four groups of photographed indicia is being transmitted, a segmented rail 64 is provided which makes contact with contact arm 65. For example, when contact arm 65 is touching segment 64a interrogation interpreter 40, identifies this as the first series of dashes photographed on the film. As it makes contact with segment 64b, it identifies these impulses as coming from and being associated with the second group of dashes. Segments c and d identify the group of electrical impulses being transmitted in the same manner. Thus coded information is transmitted to the interrogation interpreter and may be of a nature and range extending from the number 0 to the number 9999.

For furnishing information to the interrogation interpreter with regard to the position of the projected area in a transverse direction across the film, a segmented commutator type disk 71 is utilized. Each of these segments is connected to a wire which in turn leads to the interrogation interpreter. Making contact with these segments one at a time is a contact arm 72 which causes an electrical signal to be transmitted over one of the segments of commutator disk 71. Contact arm 72 is driven by shaft 73 which is connected to the horizontal drive means of the film magazine slide. Thereby the segments of 71 indicate to the interrogation interpreter the transverse position of the film being projected.

Such information might be used for example, to cause interrogation interpreter 40, to position the next adjacent general area chart if the axis of projection is at the edge of the chart being viewed, whereas if the axis of projection is in a center location, the local chart of the area being viewed could be selected. Similarly when viewing approach procedure charts which might be placed three abreast across the film, such relative transverse information could be used to position the correct area chart with respect to the particular approach procedure chart being viewed.

As already noted, interrogation interpreter 40 is adapted to identify and interpret the signals produced by the coding on the side of the film and the other signals previously described. The interrogation interpreter is an electrical switching device which receives the information as described previously and adjusts a reference voltage which can be connected to the differential amplifier DA1 as input $I_3$ and replace the reference voltage derived from the position of contact 27 on potentiometer P1 in the manual setting means described. Referring to FIG. 5, which is an isometric schematic electrical diagram of the interrogation interpreter, a stepping motor or stepper Sa has been provided which is a rotating type device that produces a fixed increment of rotation for each pulse of direct current applied to its driving electrical contacts. Attached to the driven output shaft of stepping motor Sa is a potentiometer P3 and a matching potentiometer P4. The potentiometer body and resistance coil is fixed to the chassis of the machine and does not rotate. However contact arms 101a and 101b assume a position about the resistance of the potentiometers P3 and P4 which depends upon the number of impulses that have been received by stepper Sa. Such increments of resistance value may be fixed by taps from the winding of potentiometers P3 and P4 leading to contact points 101c, 101d and 102c, 102d, etc. Potentiometers P3 and P4 are of identical resistance value and contact points 101c and 101d are positioned on the potentiometer so that the resistance value from the end of the potentiometer winding to the contact point is identical as the follower travels around touching the contact points. The effective resistance to be used from potentiometer P3 is the resistance on the diagram in a clockwise direction from the contact arm to the terminal point and as contact arm 101a is rotated this resistance is varied in amount. The resistance to be used in potentiometer P4 is the counterclockwise resistance from the contact arm 101b to the terminal point. In a similar manner, steppers Sb, Sc and Sd position the contact arms 102a and 102b, 103a and 103b, 104a and 104b, respectively on contact points on potentiometers P5, P6, P7, P8, P9, and P10, respectively. Contact arm 101a is connected electrically to a series of resistors R105a, R105b, R105c, R105d, etc. The other end of these resistors is each connected to the emitter of a PNP type transistor. For example, a 2N1305 transistor might be used. The collector of each of these transistors is connected to a common terminal. These transistors are numbered 106a, b, c, d, etc. The latter common terminal is connected to a series of resistors numbered 107a, b, c, d, etc., and to the opposite end of each of these resistors is connected a transistor of the PNP type and could be the same as the one previously used as part 106. The collectors of the 108 transistor bank are all connected to a common terminal. This terminal is then connected to the follow arm of the potentiometer P4 numbered 101b. It may be seen therefore that a voltage applied at +V, a terminal on potentiometer P9, follows a resistance path through potentiometer P9, P7, P5, P3, and through any one of the resistance paths for which the transistor 106a, 106b, etc., and 108a, 108b, etc., are conductive. Thence, the voltage will be applied to the follower arm of potentiometer P4 and through the resistance in series of P4, P6, P8 and P10 to the grounded terminal on potentiometer P10. The total resistance value of potentiometer P9 is identical with the total resistance value of potentiometer P10. Thus it may be seen that a portion of this total resistance value is introduced by one potentiometer P9, for example, while the remaining amount of resistance which these potentiometers contain is introduced by the second potentiometer P10. This same condition exists between potentiometers P7 and P8, P5 and P6, P3 and P4. The resistance value of potentiometer P4 is ten times the resistance value of potentiometer P6 which is ten times the resistance value of potentiometer P8 which is in turn ten times the resistance value of potentiometer P10. The resistance value of resistance 105a plus the resistance value of 107a is equal to a fixed amount. The sum of the resistance 105b and 107b is equal to this same amount. The sum of the resistance 105c and 107c is equal to the same amount, and likewise the sum of 105d plus 107d is equal to this same value. Resistance 105a, 105b, 105c, and 105d vary in size, however, the smaller one matching with a larger one on the 107 side etc. Thus, as commutator 71 is energized by follower 72 a corresponding pair of transistors 106a and 108a for example are activated to pass current, and it may be seen that the resistance in the circuit between +V and ground remains constant as the steppers assume different positions and as different segments of the commutator 71 are energized, thus opening up the path of flow of current through the various pairs of transistors 106 and 108. However, the voltage level at the collector of transistor 106 which leads out to I₃ varies as the steppers take different positions and as the commutator positions are energized. Thus the voltage read at I₃ may be varied by the means described from +V to ground as the means provided assume different positions.

The means described to produce a voltage reference which is one specific means to accomplish this function may be varied by using relays, fixed resistors or condensers and transistorized circuits to interpret the signals received. Such alternate means may likewise be used and fall within the scope and intent of this disclosure.

For the purpose of providing impulses in sequence to the steppers Sa, Sb, and Sd, a transistorized circuit has been provided which recognizes the pulses in current caused by the variation in the resistance of the photocells as they pass over the lines on the film described previously. Wire 63 provides switching information to transistors 111a and 111b. When wire 63 is on a segment of the commutator and grounded, the base terminal of transistor 111a is grounded. Transistor 111a is a PNP transistor similar to the type used at 106 and 108, and thus is conducting through photocell 41 to ground. As photocell 41 fluctuates its resistance, current is transmitted to ground in varying amounts, transistor 112 which is a PNP transistor with its base terminal connected to the emitter of transistor 111a through variable resistor $R_1$ is thus triggered to permit the passage of current to ground in pulses. The input voltage to transistor 112 is supplied from one of the stepper control transistors Nos. 113a, 113b, 113c and 113d. Wires connected to segmented rail 64 segments a, b, c, and d are in turn connected to transistors 113a, 113b, 113c, and 113d at the base terminal. When follower 65 touches a section of the segmented rail 64, thus grounding it, the associated transistor 113a, 113b, 113c, or 113d is triggered to pass current, and therefore in sequence the steppers Sa, Sb, Sc, and Sd are activated and position their respective follower arms as indicated by the dashed lines on the edge of the film. When wire 63 is grounded on a segment of commutator 61 the base terminal of transistor 114, which is a PNP type is grounded, thus transistor 114 is triggered to pass current and imposes a voltage on the base of transistor 111b so that it does not conduct. Thus photocell 41 only is connected as described. When wire 63 is not connected to ground, voltage is imposed on the base of transistor 114 and 111a through resistor $R_2$ so neither one conducts and transistor 111b is connected to ground through resistor $R_3$, thus it conducts and places photocell 42 in the circuit. Resistors $R_2$ and $R_3$ are sized to limit current flow to prohibit overload but are not of sufficient resistance value to effect control current flow. Thus, the alternate use of photocells 41 and 42 is accomplished by this means.

Follower 72 which is positioned by the lateral movement of the means to move the film magazine in longitude touches one of the segments of commutator 71 at a time indicating to the interrogation interpreter the relative position of the film in the transverse axis across the film being viewed. The grounded segment transmits a signal to a pair of transistors 106a and 108a or 106b and 108b, etc., which permits current to flow through this one pair thus regulating the voltage level of $I_3$ by the value of the resistance 105a and 107a or 105b and 107b, etc.

In order to provide a means to activate the interrogation interpreter and the automatic means to transport the film, a switch SW2 is provided which is manually operated by the pilot. Switch SW2 disconnects the input of contact arm 27 from P1 to the balance side of the differential amplifier as indicated at $I_2$, and connects a similar input from the interrogation interpreter to the differential amplifier as indicated at $I_3$. At the same time switch SW2 applies power to the interrogation interpreter to provide a means to initiate automatic interrogation and transport of the film. A momentary contact switch SW1 is provided which activates a relay $R_1$ shown in detail on FIGURE 5. Relay $R_1$ is of a multiple double throw type. The first contact $C_1$ provides a latching circuit which holds the relay in. The voltage applied to the coil causes a current to flow through contact $C_1$, through a switch SW3 which is normally closed, and to ground. To provide a means to delay the actual transport of the film until the interrogating means has read the information from the film and preset its resistance value, a contact 66 is provided on the interrogating slide. This contact is closed by the motion of the sliding member at the completion of its movement across the film. Thus, voltage is applied through contact 2 of relay $R_1$ to the differential amplifier which in turn drives motor $M_1$. Likewise, power supplied by contact 66 activates a film release solenoid which is not shown on the drawing but which causes the film to be clamped in a viewing position during normal operation of the equipment. The third contact point of relay 1 provides power to solenoid 53 which as previously stated, causes the light sensitive elements to scan the film. A manual means FM1 is provided for fine adjustment of the film after the automatic transport means has positioned it in its approximate location. The pilot may rotate FM1 for this final adjustment, and when he has positioned the film to his satisfaction in a vertical plane, he pushes in FM1 which depresses switch SW3 deactivating relay $R_1$.

For the purpose of resetting the stepping motors $Sa$, $Sb$, $Sc$, and $Sd$, and their associated potentiometer follower arms, disks 115a, 115b, 115c, and 115d have been provided. These disks are conductive to ground except in area 116 as indicated. And followers 117a, 117b, etc., are provided to make contact with the associated disks 115a, 115b, etc. When follower 117a is on a conductive portion of disk 115a, transistor 18 is opened and conducting current through its path and to ground. Likewise when follower 117a is contacting a grounded portion of a disk, or any one of its counterpart followers 117b, 117c or 117d is contacting a grounded portion of its associated disk, the base of transistor 119 is likewise grounded and it is conducting. Thus when relay $R_1$ is deactivated and contact $C_3$ provides voltage through transistor 119 and through vibrator 120 which is a conventional pulse generating type vibrator, pulses are fed to the steppers $Sa$, $Sb$, $Sc$, and $Sd$ as long as their corresponding follower arm 117 is touching a conducting surface of the disk 115. Thus, each stepper continues to rotate until its follower rests on a non-conducting area 116 at which time the stepper has re-positioned itself at zero and is ready for the next interrogation. When all of the steppers have reached the zero position, the grounding means of the base of transistor 119 is shut off and transistor 119 stops the flow of current through the vibrator and to the steppers. Diode 120a is provided in the circuit between contact 117a and the common connection to the base of transistor 119 so that contact 117a causes transistor 118a and 119 to conduct but is isolated as to proper current flow from causing transistors 118b, 118c or 118d from conducting as well. In like manner diodes 120b, 120c and 120d isolate the corresponding contacts 117b, 117c and 117d.

SYNOPSIS OF OPERATION FOR SEMI-AUTOMATIC POSITIONING OF FILM

When the pilot desires to select a section of the film with reference to the index 29 as shown by pointer 30, he manually positions switch SW2 on position M (manual). Reading information then from either the film as projected on the screen or from an index provided elsewhere, he dials into the presetting means control 30, the coded index number of the film which he desires to view. He then depresses switch SW1 which causes the film to be released and transported to the area corresponding to the code which he has selected. By manipulation of manual dial $FM_1$, he may then fine position the film to his satisfaction and then by depressing control $FM_1$, the film will be locked in place.

SYNOPSIS OF OPERATION FOR AUTOMATIC POSITIONING OF FILM

When the pilot desires to position the film in an automatic manner based on the position as coded on the edge of the film, he places switch SW2 in position A (automatic) and then depresses switch SW1. The means provided herein then reads the coded information from the film, presets the selector, causes the film to be released, and automatically transports the film strip to the new location. When the film has stopped traversing, the pilot may then fine adjust with dial $FM_1$. When it is adjusted to his satisfaction he may depress $FM_1$ and the film is then repositioned and held ready to be used in the normal viewing position.

The remainder of the controls depicted on the control panel and shown in FIGURE 6 are associated with the operation of the equipment with which this film transport and index means cooperate and are not used in performing the function of film transport and/or indexing.

I claim:

1. In a navigational chart display apparatus for aircraft and other vehicles, the combination comprising:
    (a) a strip film of substantial length depicting a plurality of navigational and informational charts of regions to be traveled,
    (b) a strip film storage means,
    (c) a film support through which said strip film is threaded and in which an area of said film is held for projection,
    (d) a viewing screen,
    (e) means for projecting an incremental area of a selected frame of said strip film on said screen,
    (f) drive means for moving said strip film transversely of the projection axis,
    (g) means for generating an identifying signal corresponding to the location of said incremental area with respect to the total length of said strip film as defined by the locating sprocket holes therein,
    (h) means defining coded indicia on said strip film adjacent to said incremental projected area, said indicia referring to another area of said strip film related to said first incremental area,
    (i) means for reading said coded indicia with a single scanning device and for generating a preset signal corresponding to the location of said other area of said strip film related to said first incremental area,
    (j) control means responsive to the difference between said identifying signal and said preset signal for actuating said drive means in a direction to null out said difference whereby said film is automatically moved in accordance with said coded indicia to display said related area on said viewing screen, and
    (k) means for maintaining constant along the length of said strip film the distance between said reading means and the projection axis as said film is moved transversely of said axis.

2. In a navigational chart display apparatus for aircraft and other vehicles, the combination comprising:
    (a) a film strip of substantial length depicting a plurality of navigational and informational charts of regions to be traveled,
    (b) a strip film storage means,
    (c) a film support through which said strip film is threaded and in which an area of said film is held for projection,
    (d) a viewing screen,
    (e) means for projecting an incremental area of said film on said screen,
    (f) drive means for moving said strip film transversely of the projection axis,
    (g) means for generating an identifying signal corresponding to the location of said incremental area with respect to the total length of said strip film as defined by the locating sprocket holes therein,
    (h) means for generating a manual preset signal corresponding to a selected area of the total film strip, and
    (i) control means responsive to the difference between said manual preset signal and said identifying signal for moving said film drive in a direction to null out said difference and display said selected area on said screen.

3. The combination set forth in claim 1, including a differential amplifier connected to said film drive means, said amplifier being responsive to the difference between said identifying signal and said preset signal and to actuate said film drive means in a direction to null out said difference.

4. The combination set forth in claim 3, wherein said identifying signal is a voltage derived from said film drive means and said preset signal is a voltage derived from readout of said coded indicia.

5. The combination set forth in claim 2, including a differential amplifier connected to said film drive means, said amplifier being responsive to the difference between said identifying signal and said preset signal to actuate said film drive means in a direction to null out said difference.

6. The combination set forth in claim 5, wherein said identifying signal is a voltage derived from said film drive means and said preset signal is a voltage derived from a manually adjusted reference source.

7. The combination set forth in claim 1, including an adjustable control operatively associated with said control means for precisely adjusting the position of said strip film and thus said incremental projected area on said screen.

8. The combination set forth in claim 2, including an adjustable control operatively associated with said control means for precisely adjusting the position of said strip film and means for clamping said film in precisely adjusted position.

References Cited

UNITED STATES PATENTS

| | | | |
|---|---|---|---|
| 2,637,848 | 5/1953 | Cunningham | 343—112 |
| 2,769,977 | 11/1956 | Roberts et al. | 343—112 |
| 2,814,199 | 11/1957 | Waldorf et al. | 343—112 X |
| 2,836,816 | 5/1958 | Allison et al. | 343—112 |
| 3,191,315 | 6/1965 | Hannah | 35—9 |

FOREIGN PATENTS 1,128,682  4/1962  Germany.

EUGENE R. CAPOZIO, Primary Examiner

W. H. GRIEB, Assistant Examiner

U.S. Cl. X.R.

343—112